Oct. 20, 1931.    R. S. HOWARD    1,828,046

METHOD OF PRODUCING CARBON GRANULES

Filed April 12, 1928

Inventor
Russell S. Howard
by [signature] Att'y.

Patented Oct. 20, 1931

1,828,046

UNITED STATES PATENT OFFICE

RUSSELL SAMUEL HOWARD, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF PRODUCING CARBON GRANULES

Application filed April 12, 1928. Serial No. 269,503.

This invention relates to a method of producing carbon granules, and more particularly to a method of treating carbonizable material to form hard spherical carbon granules.

In variable resistance units such as are used in sound translating devices of which a telephone transmitter is an example, the use of carbon particles of a uniform size and of a spherical shape is very desirable in order to obtain uniform microphonic properties. In some instances where irregularly shaped particles have been used there is a tendency for the sharp points of the carbon to penetrate the thin walls of the container of the unit and thus cause a leakage of the carbon from the container, thereby impairing the efficiency of the unit.

It is an object of this invention to provide an economical method for producing hard carbon in a very efficient form for use in variable resistance units.

In accordance with the general features of the invention, hard spherical carbon granules are prepared from synthetic resins commonly known as condensation products, which are granulated and screened until particles of a predetermined size are obtained. These particles are then placed upon a surface which they will not wet and heated until they become molten. Since the surface has a high capillary repulsion for the particles, the particles are drawn into spherical form due to surface tension in which form they are cooled and hardened and subsequently carbonized.

Figure 1:
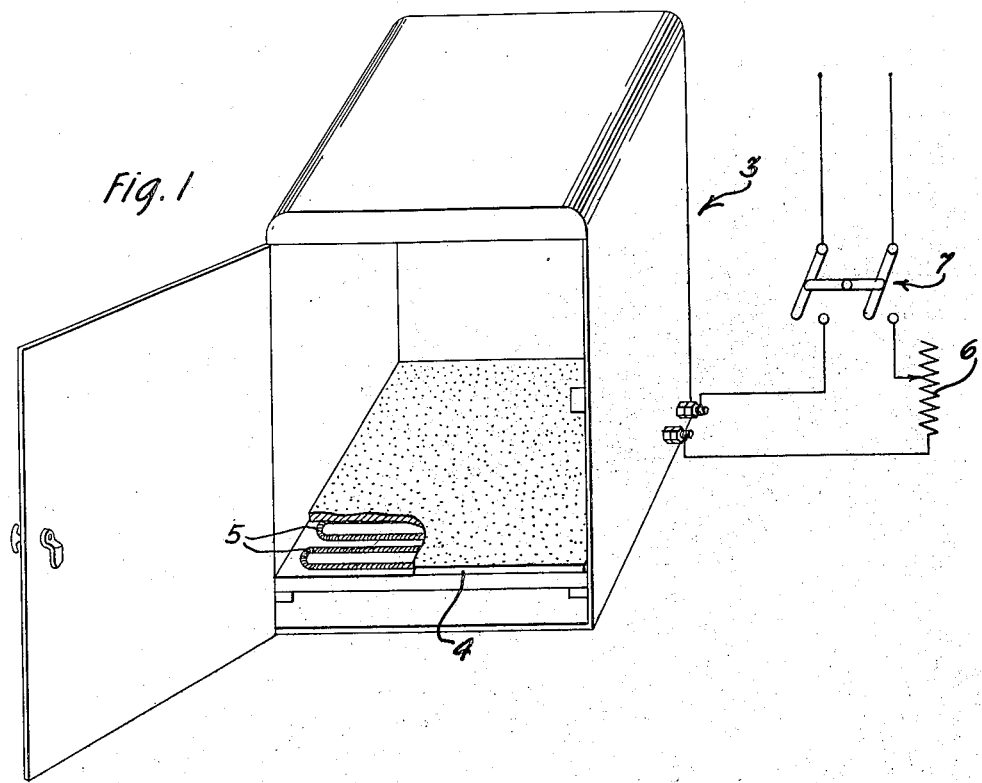
Figure 2:
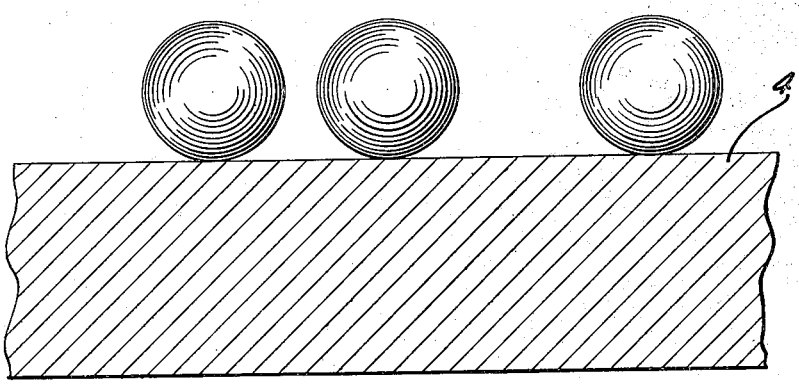

It is believed that a complete understanding of the invention may be had by reference to the following description taken in conjunction with the accompanying drawings, in which Fig. 1 illustrates an apparatus for melting the particles, and Fig. 2 is an enlarged view of a number of spherical particles on a surface upon which they were molten.

In practicing the method the particles which are to be carbonized are preferably prepared from synthetic resins commonly known as phenolic condensation products, particularly the cresylic acid resins. A quantity of such material is crushed or granulated by any well known means to such a degree that a large part of the material will consist of particles of the desired bulk or mass. The particles are then screened to eliminate the oversized and undersized particles which may be remelted and used again.

The resin particles of the desired size are placed upon a surface which they will not wet when molten, such as an oxidized metal surface or preferably an asbestos surface. Fig. 1 illustrates an oven 3 which may be used for this purpose having an asbestos plate 4 which is slidably mounted therein so as to be readily removable. A plurality of electric heating elements 5 are located underneath the plate to uniformly heat the plate to the required temperature. The heating elements 5 may be connected to any suitable source of current (not shown) through a rheostat 6 by which a close temperature control may be obtained. As soon as the resin particles become molten they will be immediately formed into spherical granules whereupon the electrical current may be interrupted by means of a switch 7 to allow the granules to cool and solidify or the asbestos plate may be withdrawn from the oven to cool and solidify the granules while another similar plate with resin particles is placed in the oven.

In order to carbonize the resinous condensation products they are heated first for about twenty to thirty hours to a temperature which continuously rises from about 70° C. to about 290° C. The heating may be carried on in an oven heated first by steam and then by gas combustion. This stage of heating produces complete polymerization and hardening of the condensation products and drives out the gases. After the preliminary stage, the hardened resin is carbonized, the resin is preferably packed in a carbon or graphite container and a protective material, such for example, as peat. The container packed in coke, lamp black, or the like, is slowly heated by gas combustion or electrically to a temperature rising to about 700° C. in about one week. The carbon is given a final firing at a temperature rising from 800° to 1100° C. in a few hours, whereupon it is cooled and ready for use.

It has been found that spherical carbon granules formed as described above are particularly well adapted for use in sound transmitting devices having what is known as a floating diaphragm which is resiliently supported. The spherical granules have no appreciable tendency to work their way out of their container through the juncture between the container and the diaphragm. When the spherical particles are used in variable resistance units very satisfactory results are also obtained due to the fact that the spherical granules can conveniently be made of a substantially uniform size and therefore a more uniform variation of the resistance will result.

It will be understood that the illustration of the invention herein described is merely a convenient and useful form of the invention which is capable of many other modifications without departing from the spirit and scope of the invention.

What is claimed is:

1. A method of producing carbon granules which comprises heating comminuted particles of a fusible solid phenolic condensation product out of contact with each other for a sufficient length of time to harden them, and then carbonizing the particles.

2. A method of producing spherical carbon granules which comprises placing comminuted particles of a fusible solid phenolic condensation product in dispersed relation upon an asbestos surface, gradually raising the temperature of the particles from about 70° to about 290° C. over a period of from 20 to 30 hours to harden the particles, and carbonizing the hardened particles by gradually raising their temperature to about 700° C. over a period of about one week.

3. A method of producing carbon granules which comprises rapidly heating particles of a fusible solid phenolic condensation product to melting out of contact with each other, then solidifying the molten particles by cooling the same, then hardening the particles by slowly heating them while maintaining them in separated relation, and then carbonizing the particles.

4. A method of producing carbon granules which comprises rapidly melting particles of a fusible solid phenolic condensation product into separate droplets out of contact with each other on a surface, then solidifying the resulting granules by chilling the same, then converting them without softening into fusible resin by heating the granules slowly, and then carbonizing the granules.

In witness whereof, I hereunto subscribe my name this 29 day of March, A. D. 1928.

RUSSELL SAMUEL HOWARD.